(12) United States Patent  
Vargantwar et al.

(10) Patent No.: US 8,588,697 B1
(45) Date of Patent: Nov. 19, 2013

(54) WIRELESS COMMUNICATION SYSTEM FOR REDUCING THE REVERSE NOISE AT A WIRELESS ACCESS NODE

(75) Inventors: Sachin R. Vargantwar, Overland Park, KS (US); Manoj Shetty, Overland Park, KS (US); Bhagwan Singh Khanka, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 824 days.

(21) Appl. No.: 12/816,925

(22) Filed: Jun. 16, 2010

(51) Int. Cl.
*H04B 1/00* (2006.01)
*H04B 15/00* (2006.01)

(52) U.S. Cl.
USPC ............... 455/63.1; 455/67.11; 455/67.13; 455/561; 455/450; 455/452.1; 455/452.2; 455/500; 455/501; 455/507; 455/509

(58) Field of Classification Search
USPC ........... 455/450, 452.1, 452.2, 500, 501, 507, 455/509, 515, 63.1, 67.11, 67.13, 561
See application file for complete search history.

(56) References Cited

U.S. PATENT DOCUMENTS

| | | | |
|---|---|---|---|
| 6,748,247 B1 | 6/2004 | Ramakrishnan et al. | |
| 7,289,480 B2 | 10/2007 | Lundstrom et al. | |
| 7,330,735 B2 * | 2/2008 | Glazko et al. | 455/552.1 |
| 7,773,992 B2 * | 8/2010 | Glazko et al. | 455/436 |
| 7,933,602 B1 * | 4/2011 | Balakrishnan et al. | 455/437 |
| 8,289,864 B2 * | 10/2012 | Dolganow et al. | 370/252 |
| 8,331,327 B1 * | 12/2012 | Vargantwar et al. | 370/332 |
| 2002/0160812 A1 | 10/2002 | Moshiri-Tafreshi et al. | |
| 2003/0235171 A1 | 12/2003 | Lundstrom et al. | |
| 2006/0245370 A1 | 11/2006 | Ranganathan | |

* cited by examiner

*Primary Examiner* — Tuan A Tran

(57) ABSTRACT

Embodiments disclosed herein provide systems and methods for modifying a dormancy timer in a wireless communication device. In a particular embodiment, a method comprises exchanging wireless communications between a wireless device and an access node on a wireless communication network. The method further comprises determining a reverse noise indicator for the access node. The method also includes determining a modification for a dormancy timer in the wireless access node based on the reverse noise indicator, wherein the dormancy timer indicates when a communication access channel on the wireless access node that is allocated to the wireless device should be released. Additionally, the method comprises modifying the dormancy timer in accordance with the dormancy timer modification.

20 Claims, 7 Drawing Sheets

| RNR | OCCUPANCY | DORMANCY TIMER |
|---|---|---|
| HIGH | LOW | 5 sec |
| LOW | HIGH | 30 sec |
| HIGH | HIGH | 7 sec |
| LOW | LOW | 15 sec |

WIRELESS COMMUNICATION SYSTEM FOR REDUCING THE REVERSE NOISE AT A WIRELESS ACCESS NODE

TECHNICAL BACKGROUND

Wireless devices, such as cellular phones, communicate with wireless communication networks via access nodes, such as base stations. The wireless communications between the wireless devices and the network occur using frequencies in the radio frequency (RF) band of the electromagnetic spectrum. Some communications, such as user voice and data communications, typically use an access channel, while control communications from the wireless network typically use a control channel.

Signals from a wireless device to a base station may be interfered with by other electromagnetic radiation in the same RF band as the signal from the wireless device. This radiation is called interference, or noise, because it may hinder the ability of the signal to be received and interpreted properly. Sometimes the noise can be caused by devices communicating with the same base station on similar frequencies to that of the wireless device. Noise received at the base station when the base station is communicating with the wireless device is called the reverse noise. Reducing the reverse noise may provide better conditions for the base station to communicate with the wireless device.

In order to help manage reverse noise and connections to a base station the base station may also maintain a dormancy timer. A dormancy timer tracks the amount of time that has elapsed since the last communication was exchanged on an access channel assigned to a wireless device. Once the timer indicates that enough time has passed since the last communication exchange, then the base station releases the access channel for use by other wireless devices.

OVERVIEW

Embodiments disclosed herein provide systems and methods for modifying a dormancy timer in a wireless communication device. In a particular embodiment, a method comprises exchanging wireless communications between a wireless device and an access node on a wireless communication network. The method further comprises determining a reverse noise indicator for the access node. The method also includes determining a modification for a dormancy timer in the wireless access node based on the reverse noise indicator, wherein the dormancy timer indicates when a communication access channel on the wireless access node that is allocated to the wireless device should be released. Additionally, the method comprises modifying the dormancy timer in accordance with the dormancy timer modification.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
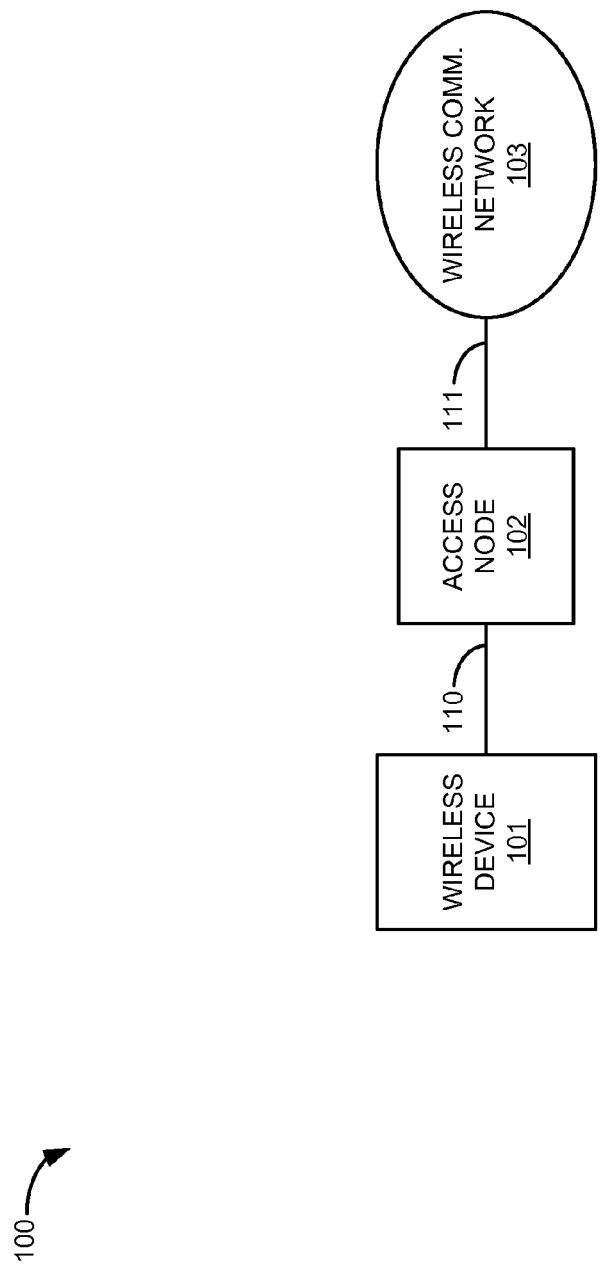
FIG. 1 illustrates a wireless communication system.

FIG. 1 illustrates wireless communication system 100. Wireless communication system 100 includes wireless communication device 101, wireless access node 102, and wireless communication network 103. Wireless communication device 101 and wireless access node 102 communicate over wireless link 110. Wireless access node 102 and wireless network 103 communicate over communication link 111.

In operation, wireless device 101 communicates with other systems and devices over wireless network 103 via access node 102. Wireless device 101 and access node 102 communicate using signals in the radio frequency (RF) band of the electromagnetic spectrum. Any RF radiation or signals received by access node 102 when access node 102 is communicating with wireless device 101 other than the RF signal from wireless device 101 is RF interference, otherwise known as noise. The noise may be caused by natural RF radiation, other wireless devices, or anything else that may interfere with the RF reception of access node 102. Access node 102 is capable of communicating with multiple wireless devices, therefore, RF signals from those other devices may also be considered noise in relation to the signal for wireless device 101. Likewise, RF signal from wireless device 101 may be noise in relation to signals from those other devices.

Furthermore, when wireless device 101 is ready to exchange communications, wireless device 101 receives an access channel for access node 102. This access channel, in addition to the wireless protocol used to modulate the communication signal, allows wireless device 101 to communicate with access node 102 without the signal of wireless device 101 becoming lost amongst the signals from the other devices communicating with access node 102. Access node 102 has a finite number of access channels that wireless devices may use, thus, access node 102 will also have at least one control channel that access node 102 uses to regulate access by a wireless device to an access channel. The control channel signals wireless devices connected to access node 102 when one of the devices is receiving a call, voicemail, text message, email, or any other type of data or communication. If a wireless device receives a notification, then the wireless device and access node 102 will take appropriate action to provide wireless device 101 with an access channel for communications, provided an access channel is necessary.

Additionally, in order to manage access channels allocated to wireless devices, access node 102 maintains a dormancy timer for each wireless device that is allocated an access channel on access node 102. The dormancy timer indicates when an access channel allocated to a wireless device should be released from that wireless device. For example, the dormancy timer starts counting after the most recent communication exchange between wireless device 101 and access node 102. Upon expiration of the dormancy timer, access node 102 releases the access channel from wireless device 101 because wireless device 101 has been dormant for too long and is not using the access channel enough to justify having the access channel allocation. If communications are exchanged again before the expiration of the dormancy timer, then the dormancy timer will reset. A shorter dormancy timer period reduces the amount of time that a wireless device is assigned an access channel.

Figure 2:
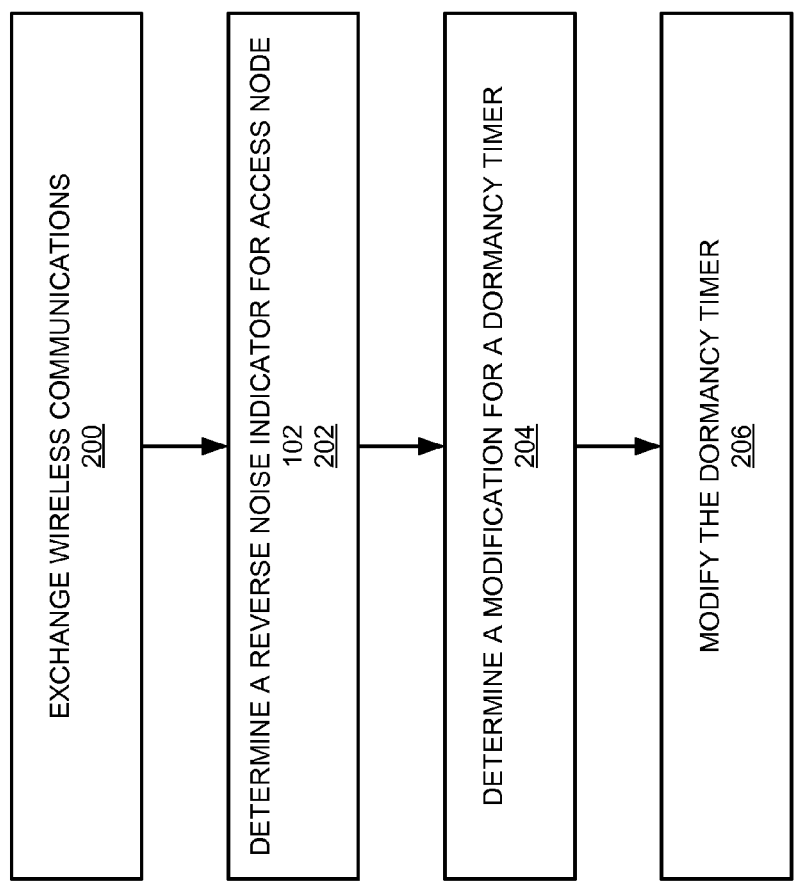
FIG. 2 illustrates the operation of a wireless communication system.

FIG. 2 illustrates the operation of wireless communication system 100. Wireless device 101 exchanges wireless communications with access node 102 (step 200). The wireless communications may be communications over an access channel, communications over a control channel, a pilot signal from access node 102, or any other time of communications transferred between wireless device 101 and access node 102—including combinations thereof.

Access node 102 determines a reverse noise indicator for access node 102 in relation to the communications with wireless device 101 (step 202). The indicator may be any value or other representation as to how much noise is received at access node 102 for communications from wireless device 101. For example, the indicator may be the power level of the noise, a ratio of the power of the signal from wireless device 101 to the power of the noise, a less specific indicator such as that the noise level is low, medium, or high, or any other type of noise indicator.

Then, access node 102 determines a modification for a dormancy timer in access node 102 based on the reverse noise indicator (step 204). Generally, the dormancy timer modification sets the dormancy timer to a longer period based on an indication that the noise level is high. Conversely, if the noise level is indicated as being low, then the modification typically sets the dormancy timer to a shorter period of time. Access node 102 may use an algorithm or reference a data structure to determine the appropriate modification of the dormancy timer. The dormancy timer modification may be a new time duration value for the dormancy timer or an adjustment value from the previous setting for the dormancy timer. After determining the dormancy timer modification, access node 102 modifies the dormancy timer in accordance with the dormancy timer modification (step 206).

In some embodiments, access node 102 also determines a control channel occupancy for the control channel. The occupancy of the control channel depends on the amount of traffic, such as notifications, queries for notifications, connection set up messages, and other signaling, that is being transferred on the control channel between access node 102 and all connected wireless devices using the control channel, which may include wireless device 101. A high amount of traffic is a high occupancy and a low amount of traffic is a low occupancy. The occupancy may be indicated by a quantifiable value, such as an amount of traffic in a period of time, a less specific indication of high, medium, or low occupancy in relation to a threshold, or any other type of indicator that would identify the occupancy level of the control channel. Access node 102 may then determine the modification for dormancy timer based on both the reverse noise indicator and the control channel occupancy.

The process of FIG. 2 may continue periodically or continuously while wireless device 101 is communicating with access node 102. Thus, the dormancy timer may continue to be modified based on changing RNR and control channel occupancy conditions.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Wireless communication network 103 is a communication network that comprises telephony switches, wireless access nodes, Internet routers, network gateways, computer systems, communication links, or some other type of communication equipment—including combinations thereof.

Wireless link 110 uses the air or space as the transport media. Wireless link 110 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 111 uses metal, glass, air, space, or some other material as the transport media. Communication link 111 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 111 could be a direct link or may include intermediate networks, systems, or devices.

Figure 3:
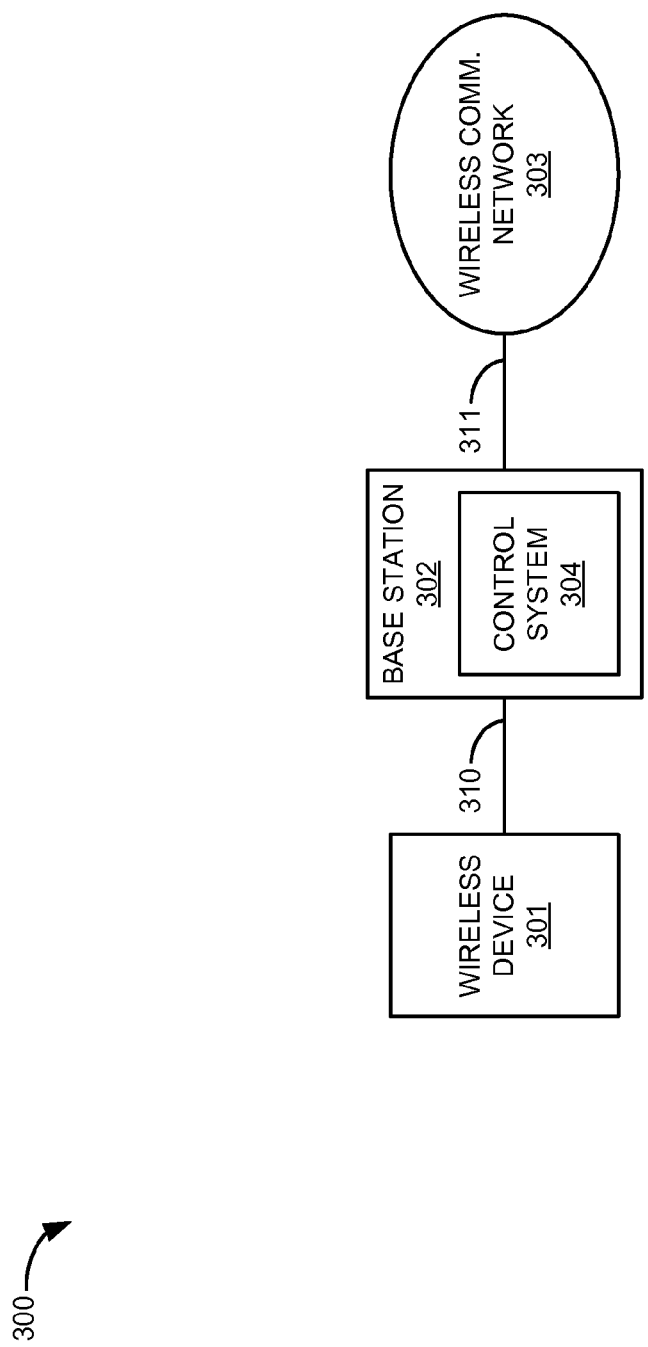
FIG. 3 illustrates a wireless communication system.

FIG. 3 illustrates wireless communication system 300. Wireless communication system 300 includes wireless communication device 301, base station 302, wireless communication network 303, and control system 304. Wireless device 301 and base station 302 communicate over wireless link 310. Base station 302 and wireless network 303 communicate over link 311.

Communication control system 304 comprises a computer system and communication interface. Communication control system 304 may also include other components such a router, server, data storage system, and power supply. Communication control system 304 may reside in a single device or may be distributed across multiple devices. Communication control system 304 is shown internally to base station 302, but system 304 could be an independent system or integrated into another system of wireless network 303.

Figure 4:
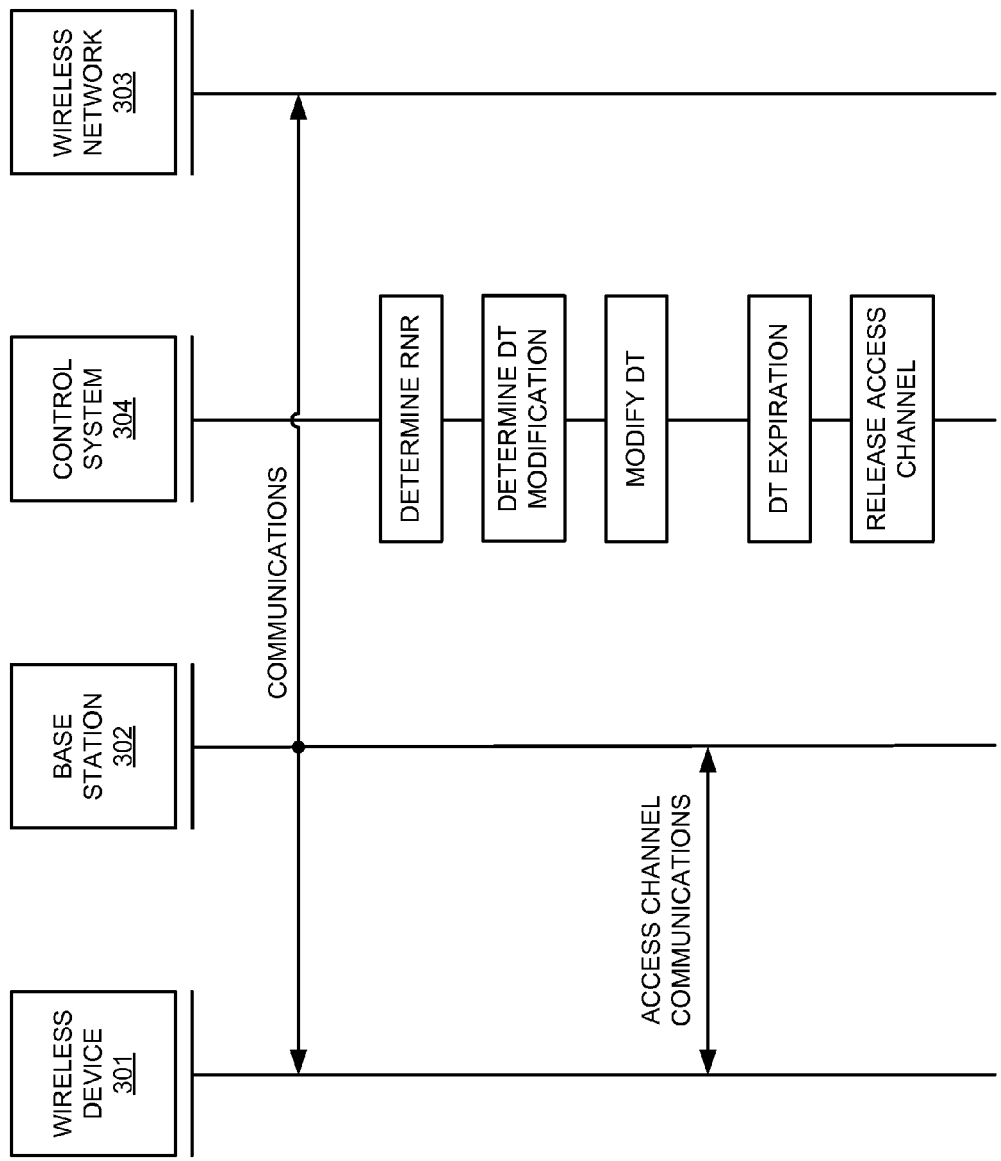
FIG. 4 illustrates the operation of a wireless communication system.

FIG. 4 is a sequence diagram illustrating the operation of wireless communication system 300. The operation begins with wireless device 301 exchanging communications with wireless network 303 via base station 302. The wireless communications between wireless device may be communications over an access channel, communications over a control channel, a pilot signal from access node 102, or any other time of communications transferred between wireless device 101 and access node 102—including combinations thereof. Communications on an access channel between wireless device 301 and base station 302 are monitored and a dormancy timer maintained by control system 304 is started after each communication exchange. If more communications are exchanged on the access channel before the dormancy timer expires, then the dormancy timer is reset. Upon expiration of the dormancy timer, the access channel is released from wireless device 301. Thus, if wireless device 301 and base station 302 require an access channel for further communications, a new access channel will need to be assigned.

Control system 303 determines a reverse noise ratio (RNR) for communications from wireless device 301. The RNR is a ratio of the power level of the communication signal from wireless device 301 compared to the power level of the noise received by base station 302 that possibly interferes with that signal. Thus, a high RNR corresponds to a higher signal power in relation to the noise and a low RNR corresponds to a lower signal power in relation to the noise. Generally, as the RNR increases so does the probability that the signal from wireless device 301 can be interpreted over the noise.

Control system 303 then determines a modification for a dormancy timer within wireless device 301 based on the RNR. Generally, higher RNRs allow for more connection attempts by wireless devices requesting access channels on base station 302. Thus, higher RNRs allow for a shorter dormancy timer period for access channels to be released because base station 302 can handle more connection attempts to gain or regain an access channel. Conversely, lower RNRs do not allow as many connection attempts, which also tend to increase the reverse noise. Thus, a longer dormancy timer period may be required so that wireless devices hold their access channels longer in order to reduce the number of connection attempts. Depending on the current setting of the dormancy timer the modification may indicate that the dormancy timer should be increased, decreased, or remain the same.

After determining the dormancy timer modification, control system 304 modifies the dormancy timer for the access channel in use by wireless device 301 in accordance with the dormancy timer modification. Wireless device 301 is then able to exchange communications over an access channel. After the most recent communication exchange, control system 304 starts the modified dormancy timer. If the modified dormancy timer does not expire before more communications are exchanged, then control system 304 resets the timer. If the modified dormancy timer does expire, then control system 304 releases the access channel between wireless device 301 and base station 302.

Figure 5:
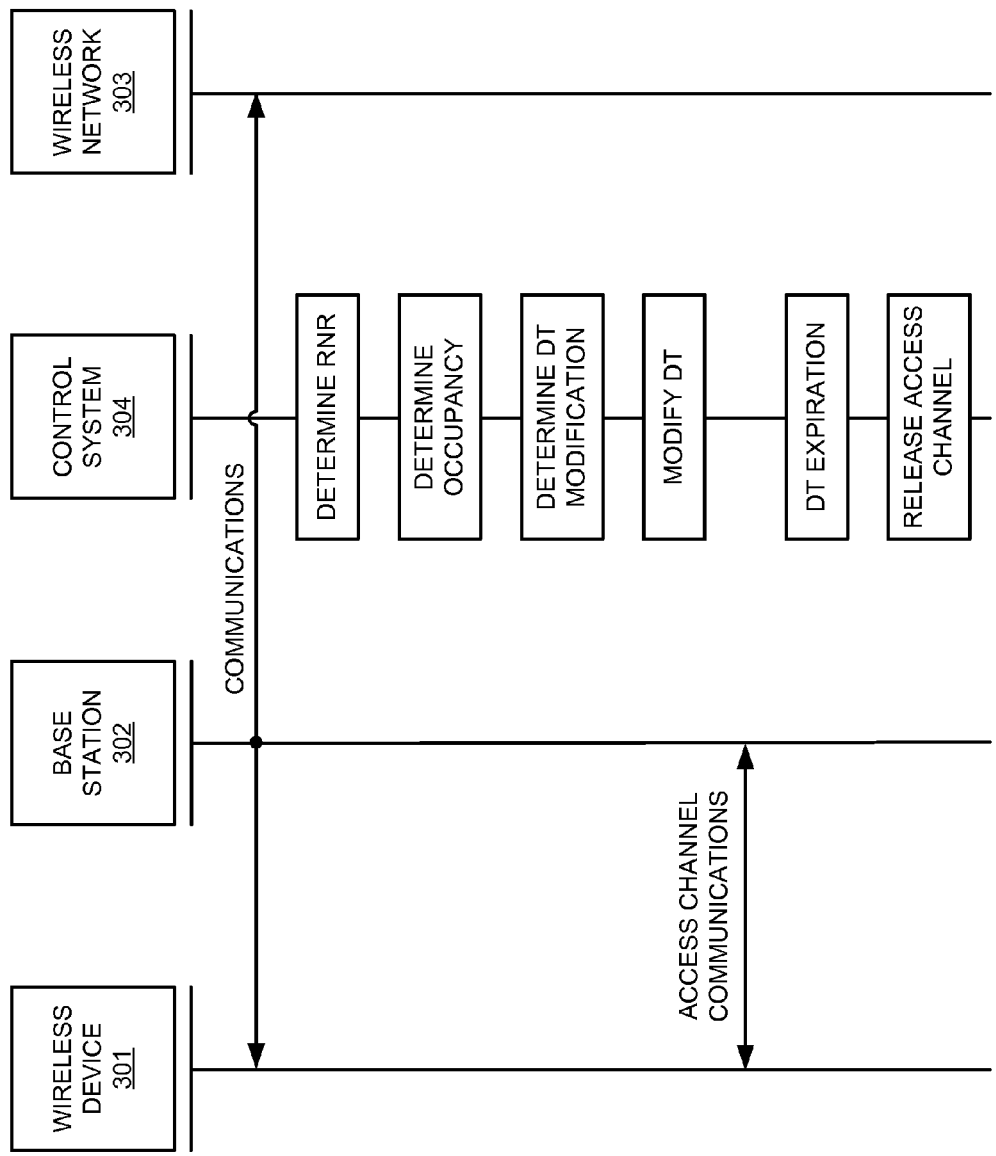
FIG. 5 illustrates the operation of a wireless communication system.

FIG. 5 is a sequence diagram illustrating the operation of wireless communication system 300. The operation begins with wireless device 301 exchanging communications with wireless network 303 via base station 302. The wireless communications between wireless device may be communications over an access channel, communications over a control channel, a pilot signal from access node 102, or any other time of communications transferred between wireless device 101 and access node 102—including combinations thereof. Communications on an access channel between wireless device 301 and base station 302 are monitored and a dormancy timer maintained by control system 304 is started after each communication exchange. If more communications are exchanged on the access channel before the dormancy timer expires, then the dormancy timer is reset. Upon expiration of the dormancy timer, the access channel is released from wireless device 301. Thus, if wireless device 301 and base station 302 require an access channel for further communications, a new access channel will need to be assigned.

Control system 303 determines a reverse noise ratio (RNR) for communications from wireless device 301. The RNR is a ratio of the power level of the communication signal from wireless device 301 compared to the power level of the noise received by base station 302 that possibly interferes with that signal. Thus, a high RNR corresponds to a higher signal power in relation to the noise and a low RNR corresponds to a lower signal power in relation to the noise. Generally, as the RNR increases so does the probability that the signal from wireless device 301 can be interpreted over the noise.

Moreover, higher RNRs allow for more connection attempts by wireless devices requesting access channels on base station 302. Thus, higher RNRs allow for a shorter dormancy timer period for access channels to be released because base station 302 can handle more connection attempts to gain or regain an access channel. Conversely, lower RNRs do not allow as many connection attempts, which also tend to increase the reverse noise. Thus, a longer dormancy timer period may be required so that wireless devices hold their access channels longer in order to reduce the number of connection attempts. Depending on the current setting of the dormancy timer the modification may indicate that the dormancy timer should be increased, decreased, or remain the same.

Additionally, control system 304 determines a control channel occupancy for the control channel on base station 302 that is used by wireless device 302. The control channel occupancy relates to the amount of control traffic on the control channel of base station 302 to connected wireless devices including wireless device 301. The control traffic may be traffic, such as notifications, queries for notifications, connection set up messages, and other signaling, that is being transferred on the control channel between base station 302 and all connected wireless devices using the control channel.

A lower control channel occupancy may allow for more connection set up messages for access channels on base station 302. Conversely, a higher control channel occupancy may mean that more connection set up messages will further congest the control channel. Thus, the dormancy timer may be set for longer time periods during times of high control channel occupancy so that wireless device 301 is assigned an access channel longer and does not need to request a new access channel for further communication exchanges. Likewise, the dormancy timer may be set for shorter time periods during times of low control channel occupancy so that the access channel is released sooner for other devices to use and the control channel can handle more communication set up messages if another access channel is needed for further communications.

Control system 303 then determines a modification for a dormancy timer within wireless device 301 based on the RNR and the control channel occupancy. Thus, the modification of the dormancy timer should be a balance of the preferred time period attributes for the dormancy timer as discussed above regarding the RNR and control channel occupancy. Depending on the current setting of the dormancy timer the modification may indicate that the dormancy timer should be increased, decreased, or remain the same.

After determining the dormancy timer modification, control system 304 modifies the dormancy timer for the access channel in use by wireless device 301 in accordance with the dormancy timer modification. Wireless device 301 is then able to exchange communications over an access channel. After the most recent communication exchange, control system 304 starts the modified dormancy timer. If the modified dormancy timer does not expire before more communications are exchanged, then control system 304 resets the timer. If the modified dormancy timer does expire, then control system 304 releases the access channel between wireless device 301 and base station 302.

Figure 6:
FIG. 6 illustrates a dormancy timer setting table.

FIG. 6 illustrates table 600 in an example of how wireless device 301 may determine a modification for the dormancy timer as discussed in FIG. 5. The information provided by table 600 may be contained in other types of data structures and take different forms.

The columns include a dormancy timer period value in one column that corresponds to the RNR levels and control channel occupancy levels presented in the same row of the other two columns. The high and low values shown in the RNR and occupancy level columns may be based on the RNR or occupancy level being above or below a threshold. However, either column may contain different indicators, such as actual values for RNR and occupancy level, as well as contain multiple threshold levels beyond the two shown in order to provide more precise dormancy timer modifications other than the four shown in this example. The dormancy timer column displays specific dormancy timer values but may contain values other than those shown in this example. Additionally, the dormancy timer values may be expressed in other ways using various units. For example, the values may express a specific timer increase or decrease, or simply indicate that the dormancy timer should be increased or decreased, among other possible values.

In this example, when an access node is determining a modification for a wireless device, the access node will reference table 600. The first row indicates that if the RNR is high and the control channel occupancy is low, then the dormancy timer should be set to 5 seconds. This low time period may be appropriate because noise and control channel occupancy do not need to be reduced. The next row indicates that if RNR is low and the occupancy level is high, then the dormancy timer should be set to 30 seconds. This high time period may be appropriate because the noise may need to be reduced along with messages on the control channel. The third row indicates that if the RNR is high and the occupancy level is high then the dormancy timer should be set to 7 seconds. This time period is not as low as the time period of the first row because the noise level may not need to be reduced but the control channel occupancy may need to be reduced. The fourth row indicates that if the RNR is low and the control channel occupancy is high, then the dormancy timer should be set to 15 seconds. This time period is higher than the first and third time periods but lower than the second because the noise level needs to be reduced but the control channel occupancy is low enough to accept more access channel requests if needed.

In the preceding example the RNR tends to have more of an effect on the length of the dormancy timer than does control channel occupancy. In some embodiments, the two factors may be considered more evenly or control channel occupancy may be more influential than RNR.

Figure 7:
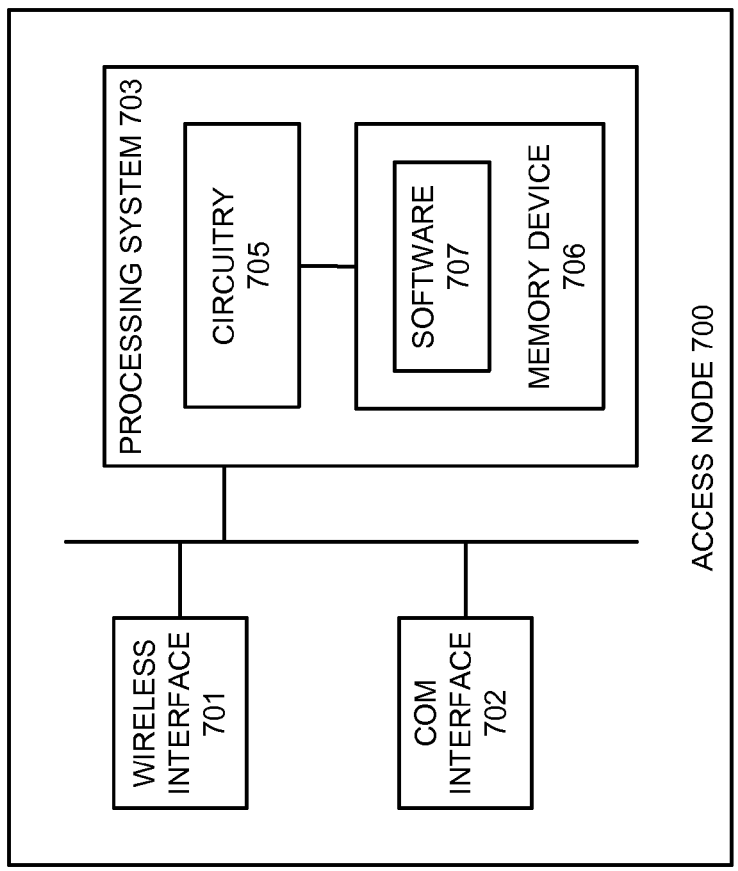
FIG. 7 illustrates a wireless access node.

FIG. 7 illustrates wireless access node 700. Access node 700 is an example of wireless access node 102, although access node 102 may use alternative configurations. Access node 700 comprises wireless communication interface 701, communication interface 702, and processing system 703. Processing system 703 is linked to communication interface 701 and user interface 702. Processing system 703 includes processing circuitry 705 and memory device 706 that stores operating software 707.

Wireless communication interface 701 comprises RF communication circuitry and an antenna. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols, such as CDMA, GSM, UMTS, HSPA, EV-DO, EV-DO rev. A, 3GPP LTE, WiMAX, Wi-Fi, or some other wireless communication format.

Network communication interface 702 comprises components that communicate over communication links, such as network cards, ports, RF transceivers, processing circuitry and software, or some other communication devices. Network communication interface 702 may be configured to communicate over metallic, wireless, or optical links. Network communication interface 702 may be configured to use TDM, IP, Ethernet, optical networking, wireless protocols, communication signaling, or some other communication format—including combinations thereof.

Processing circuitry 705 comprises microprocessor and other circuitry that retrieves and executes operating software 707 from memory device 706. Memory device 706 comprises a disk drive, flash drive, data storage circuitry, or some other memory apparatus. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate access node 700 as described herein.

In particular, operating software 707 directs processing system 703 to exchange communications with a wireless communication device via wireless communication interface 701. Processing system 703 determines a reverse noise indicator for access node 700. Additionally, processing system 703 determines a modification for a dormancy timer in the wireless access node based on the reverse noise indicator, wherein the dormancy timer indicates when a communication access channel on the wireless access node that is allocated to the wireless device should be released. Then, processing system modifies the dormancy timer in accordance with the dormancy timer modification.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
    exchanging wireless communications between a wireless device and a wireless access node on a wireless communication network;
    determining a reverse noise indicator for the wireless access node;
    determining a modification for a dormancy timer in the wireless access node based on the reverse noise indicator, wherein the dormancy timer indicates when a communication access channel on the wireless access node that is allocated to the wireless device should be released; and
    modifying the dormancy timer in accordance with the dormancy timer modification.

2. The method of claim 1 wherein the reverse noise indicator is a reverse noise ratio.

3. The method of claim 1 further comprising determining a control channel occupancy for a control channel of the wireless access node and wherein determining the modification for the dormancy timer is further based on the control channel occupancy.

4. The method of claim 3 wherein the modification for the dormancy timer indicates a decrease in the dormancy timer to a first value if the reverse noise indicator is above a noise threshold and the control channel occupancy is below an occupancy threshold.

5. The method of claim 4 wherein the modification for the dormancy timer indicates an increase in the dormancy timer to a second value if the reverse noise indicator is below the noise threshold and the control channel occupancy is below the occupancy threshold.

6. The method of claim 5 wherein the modification for the dormancy timer indicates an increase in the dormancy timer to a third value that is higher than the first value and lower than the second value if the reverse noise indicator is above the noise threshold and the control channel occupancy is above the occupancy threshold.

7. The method of claim 6 wherein the modification for the dormancy timer indicates a decrease in the dormancy timer to a fourth value that is lower than the second value and higher than third value if the reverse noise indicator is below the noise threshold and the control channel occupancy is above the occupancy threshold.

8. The method of claim 3 wherein determining the modification for the dormancy timer comprises referencing a data structure comprising a plurality of noise threshold values, a plurality of occupancy threshold values, and a dormancy timer value corresponding to each combination of each of the noise threshold values and each of the occupancy threshold values.

9. The method of claim 1 further comprising returning the dormancy timer to a default value after a period of time.

10. A wireless communication system comprising:
a wireless communication network;
a wireless device configured to communicate with a wireless access node on the wireless communication network;
the wireless access node configured to:
exchange wireless communications with the wireless device;
determine a reverse noise indicator for the wireless access node;
determine a modification for a dormancy timer in the wireless access node based on the reverse noise indicator, wherein the dormancy timer indicates when a communication access channel on the wireless access node that is allocated to the wireless device should be released; and
modify the dormancy timer in accordance with the dormancy timer modification.

11. The wireless communication system of claim 10 wherein the reverse noise indicator is a reverse noise ratio.

12. The wireless communication system of claim 10 wherein the wireless access node is further configured to determine a control channel occupancy for a control channel of the wireless access node and determine the modification for the dormancy timer based further on the control channel occupancy.

13. The wireless communication system of claim 12 wherein the modification for the dormancy timer indicates a decrease in the dormancy timer to a first value if the reverse noise indicator is above a noise threshold and the control channel occupancy is below an occupancy threshold.

14. The wireless communication system of claim 13 wherein the modification for the dormancy timer indicates an increase in the dormancy timer to a second value if the reverse noise indicator is below the noise threshold and the control channel occupancy is below the occupancy threshold.

15. The wireless communication system of claim 14 wherein the modification for the dormancy timer indicates an increase in the dormancy timer to a third value that is higher than the first value and lower than the second value if the reverse noise indicator is above the noise threshold and the control channel occupancy is above the occupancy threshold.

16. The wireless communication system of claim 15 wherein the modification for the dormancy timer indicates a decrease in the dormancy timer to a fourth value that is lower than the second value and higher than third value if the reverse noise indicator is below the noise threshold and the control channel occupancy is above the occupancy threshold.

17. The wireless communication system of claim 12 wherein the wireless access node is configured to determine the modification for the dormancy timer by referencing a data structure comprising a plurality of noise threshold values, a plurality of occupancy threshold values, and a dormancy timer value corresponding to each combination of each of the noise threshold values and each of the occupancy threshold values.

18. The wireless communication system of claim 10 wherein the wireless access node is configured to return the dormancy timer to a default value after a period of time.

19. A wireless access node on a wireless communication network comprising:
a wireless communication interface configured to exchange wireless communications with a wireless device;
a processing system configured to determine a reverse noise indicator for the wireless access node and determine a modification for a dormancy timer in the wireless access node based on the reverse noise indicator, wherein the dormancy timer indicates when a communication access channel on the wireless access node that is allocated to the wireless device should be released, and modify the dormancy timer in accordance with the dormancy timer modification.

20. The wireless access node of claim 19 wherein the reverse noise indicator is a reverse noise ratio.

* * * * *